Patented Aug. 23, 1938

2,127,668

UNITED STATES PATENT OFFICE 2,127,668

HIGH TENSILE STRENGTH WAX

Elmer Wade Adams, Hammond, Ind., and Frederick H. MacLaren, Calumet City, Ill., assignors to Standard Oil Company, Chicago, Ill., a corporation of Indiana No Drawing. Application April 19, 1934, Serial No. 721,352

9 Claims. (Cl. 196—17)

This invention relates to the production of a petroleum hydrocarbon wax of high tensile strength from paraffin wax of low tensile strength by adding thereto a small proportion of petrolatum wax.

Several types of waxes may be derived from petroleum oils and in order that no confusion will arise with respect to the types of waxes employed in our invention, we will give a brief description of a process for preparing the waxes employed in our novel composition.

The term "paraffin wax" is used to define the hard, crystalline wax commonly obtained from petroleum distillates derived from mineral oils of the mixed base or paraffin base type. By the present refining methods, the crude oil is subjected to distillation whereby it is separated into a series of fractions known as "paraffin distillates." The paraffin wax is separated from the paraffin distillate by chilling to a low temperature, which may be below freezing, and then filtering the solid wax from the oil. Generally, filter presses are used to separate the paraffin wax from the oil. The wax collected in the filter press is generally referred to as "slack wax" and it contains a large quantity of oil. The oil is usually removed from the slack wax by subjecting it to a "sweating operation" usually after redistilling. The wax may be further refined by any of the conventional refining processes such as the treatment with sulfuric acid or percolation through clay. The resulting product is known as paraffin wax and is graded according to its tensile strength, melting point, oil content, hardness, etc. Paraffin waxes are quite cheap and have been used in the arts for coating papers, paper cartons, and the like. However, its low tensile strength has often interfered with its commercial use as a coating composition. Generally, the paraffin waxes have a melting point from about 110° F. to 145° F., and tensile strength from about 60 to 210 pounds per sq. in. However, most commercial paraffin waxes have a tensile strength from about 180 to 210 lbs. per sq. inch. The physical properties of the paraffin waxes will be influenced by the source of the crude oil from which they are prepared, the method of refining the paraffin wax, and the oil content of the resulting product.

The tensile strength of paraffin wax is apparently dependent upon its crystalline structure and oil content. Most paraffin waxes have a plate-like crystalline structure, and the oil in the wax tends to collect between the plate-like crystals or laminated structure and forms weak planes of cleavage. This particular crystalline structure is responsible for the low tensile strength of paraffin wax. The following table shows the effect of a small amount of oil upon the tensile strength of paraffin wax. The oil-free paraffin wax was crystallized from organic solvents such as acetone and benzol.

Table I

| | Per cent of added oil | Tensile strength in lbs./sq. inch |
|---|---|---|
| Oil-free paraffin wax, melting point 130° F. | 0 | 395 |
| | .02 | 300 |
| | .038 | 295 |
| | .154 | 160 |
| | .3 | 70 |
| Oil-free paraffin wax, melting point 136° F. | 0 | 390 |
| | .004 | 387 |
| | .008 | 347 |
| | .034 | 324 |
| | .068 | 270 |
| | .136 | 244 |
| | .272 | 176 |
| | .544 | 115 |

Another type of wax, generally referred to as petrolatum wax, can be separated from crude oil which has been stripped of its lighter fractions including paraffin distillate with fire and steam. Petrolatum wax may be prepared from any of the paraffin or mixed base crude oils but we prefer to use Salt Creek crude oil. The undistilled residue is treated with sulfuric acid and neutralized to remove the tarry matter and unsaturated hydrocarbons. The treated stock, containing a fairly high percentage of wax, as evidenced by a very high pour point, is blended with petroleum naphtha and the solution centrifuged to separate the petrolatum wax from the oil solution. This centrifuging operation produces a wax containing a small percentage of naphtha, and having a melting point when freed of the naphtha from about 140 to 170° F. This wax may be again put in solution with naphtha and recentrifuged to remove excess oil. The wax which separates in either of these operations is referred to as crude petrolatum wax. The wax separated in the second centrifuging process is fairly dry and of low oil content. This wax should not be confused with petroleum jellies which contain large amounts of oil. The wax may be again put into solution with naphtha and filtered through clay in order to improve its color. The filtered solution is then distilled to remove the naphtha, the residue being a refined petrolatum wax having a melting point within the range of 150 to 174° F. The source of the crude oil and the oil content of the refined product will affect the melting point of the final product. The refined petrolatum wax is generally considered to be amorphous wax, but needle-like crystals can be separated from this wax. An average sample of the refined petrolatum wax from Salt Creek crude has the following properties:

| | |
|---|---|
| Melting point | 150 to 174 |
| Specific gravity | .930 to .938 |
| Dielectric constant, volts | 40,000 |
| Tensile strength, pounds per sq. in. | 240 to 280 |
| Oil content | 6 to 10% |

The hereinbefore mentioned crude petrolatum wax may be fractionated into petrolatum waxes having melting points above 165° F., between the temperature range of 150 to 165° F. and 140 to 150° F. Usually this separation is effected by fractional precipitation from naphtha or ethylene dichloride solutions.

Petrolatum waxes having melting points above about 140° F., have high tensile strengths but their high cost prohibits their use in many of the industrial arts such as paper coating and the like. The term "petrolatum wax" is used in this application to cover the residual petroleum waxes having a melting point above about 145° F.

We have discovered that the tensile strength of paraffin wax can be greatly increased by adding thereto from 1 to 12% of petrolatum wax. Amounts greater than 12%, for example amounts up to 20%, may be used in the composition, however, the tensile strength of the paraffin wax is not greatly improved by amounts above 10% and the cost is greater because of the higher cost of petrolatum wax.

To illustrate our invention, the high tensile paraffin wax compositions may be prepared from paraffin waxes and petrolatum waxes identified in the following table:

*Table II*

| Sample | Melting point | Oil content | Tensile strength in lbs./sq. in. |
|---|---|---|---|
| | ° F. | Percent | |
| Paraffin wax A | 133 | About 0.5 | 62 |
| Paraffin wax B | 136 | About 1 | 228 |
| Paraffin wax C | 138.5 | About 0.5 | 88.8 |
| Petrolatum wax D | 165-168 | About 10 | 260 |
| Petrolatum wax E | 158 | About 10 | About 136 |
| Petrolatum wax F | 147 | About 10 | 120 |

Waxes having physical properties other than those shown by the above table may also be used and it should be understood that the oil content of these waxes will alter their melting points.

The high tensile strength paraffin waxes are prepared by adding a small percentage of petrolatum wax to a paraffin wax. The following table shows that a small percent of the petrolatum wax greatly increases the tensile strength of the paraffin wax.

*Table III*

| Example | Wax composition | Melting point | Tensile strength in lbs./sq. in. |
|---|---|---|---|
| I | 95% wax A 5% wax D | 135 | 156.4 |
| II | 95% wax C 5% wax F | 138.5 | 200 to 220 |
| III | 99% wax B 1% wax E | 136 | 280 |
| IV | 95% wax B 5% wax E | 136.5 | 292 |
| V | 90% wax B 10% wax E | 137.5 | 256 |
| VI | 80% wax B 20% wax E | 137 | 172 |

It should be noted that relatively small amounts of petrolatum wax, containing as much as 10% of oil, greatly increase the tensile strength of the paraffin wax even though the paraffin wax contains as much as 1% of oil. Table I shows the extent to which oil lowers the tensile strength of paraffin wax. Our invention provides a cheap and easy method for increasing the tensile strength of paraffin wax without resorting to the expensive process of removing almost all of the oil from the wax.

It is interesting to note that the phenomenon of increasing strength of paraffin wax by the addition of petrolatum wax does not occur when a high tensile strength paraffin wax is added to low tensile strength paraffin wax. For example, if 95% of wax A is mixed with 5% of a paraffin wax having a melting point of 130° F., oil content of about 0.5%, and tensile strength of 285 lbs./sq. in., the resulting composition will have a melting point of 138° F. and a tensile strength of only 60 lbs./sq. in. It is apparent that the increased strength is not a mere result of averaging a strong wax and a weak wax. The petrolatum waxes alter the crystalline structure of the paraffin wax so as to impart a high tensile strength to the resulting product. The presence of a small amount of added petrolatum wax in paraffin tends to induce the paraffin to crystallize in a fine grain or fine plate-like structure which provides for greater interlocking of paraffinic crystals and a more general distribution of any contaminating oil throughout the material. This avoids the segregation of oil between the plate-like crystalline structure of the paraffin wax and destroys the weak planes of cleavage therein.

Small amounts of ozokerite, carnauba wax, or naphthalene may be added to the admixture of paraffin wax and petrolatum wax. These ingredients may be used in amounts ranging from 0.1 to 10%. These substances improve the tensile strength of the composition and add to the ductility of the resulting product.

The effect of ozokerite upon the tensile strength of paraffin wax having a melting point of 132° F. is illustrated by the following data:

*Table IV*

| Per cent ozokerite added | Melting point of wax mixture, ° F. | Tensile strength of wax mixture in lbs./sq. in. |
|---|---|---|
| 0.00 | 132 | 195 |
| 0.25 | 132 | 239 |
| 0.50 | 132 | 264 |
| 1.00 | 132 | 303 |
| 5.00 | 134 | 266 |
| 100.00 | 168 | Too brittle |

In addition, the tensile strength of paraffin wax may be increased by adding a small proportion, generally from 0.5 to 5% of a condensation product of chlorinated paraffin and aromatic hydrocarbons such as naphthalene. These condensation products also tend to alter the crystalline structure of paraffin wax in a manner to provide a greater interlocking of the paraffin crystals. If these condensation products are added to an admixture of the herein described paraffin and petrolatum waxes, amounts ranging from 0.02 to 3% are usually satisfactory. It should be understood, however, that greater or smaller amounts may be used. These condensation products are prepared by mixing about 100 parts of chlorinated wax such as chlorinated paraffin, petrolatum, Montan or ozokerite wax with about 10 parts of naphthalene. This mixture is then heated to about 130–140° F. and agitated while 10 parts by weight of aluminum chloride is added. The admixture is then maintained at a temperature of 130 to 140° F. for a period of one to four hours. The evolved hydrogen chloride fumes are removed during the progress of the reaction and after the reaction has ceased, a relatively large amount of an extracting liquid such as carbon tetrachloride, chloroform, or the like is added in order to reduce the viscosity of the reaction mass and facilitate sludge separation. Naphtha may also be used as an extracting agent but it is not as effective as the halogenated solvents. Instead of using low temperatures to effect the above condensation, we may also use temperatures within the range of 250–350° F. Also instead of adding the aluminum chloride to an admixture of chlorinated wax and naphthalene, we may add the chlorinated wax to an admixture of the naphthalene and aluminum chloride. In this latter process we prefer to use temperatures within the range of 140–300° F.

Our new composition is particularly useful for coating wrapping paper and the like, particularly those wrapping papers used for wrapping bread and similar food products. The high tensile strength of our wax composition makes it possible to seal the wrapped bread by heating two over-lapping seams so that the wax will melt and form a strong bond. In other words, our new composition possesses excellent sealing qualities for wrapping paper of this type. In addition, our new composition has an excellent gloss when applied to paper. The superior gloss of our product is probably due to its small crystalline structure.

The tensile strength of the products as given herein were determined at about 70° F.

Our new wax composition may be used to coat paper by any of the conventional methods and the wax may also be applied to papers which have been sized.

While we have described our invention with reference to paraffin wax and petrolatum wax having specific physical properties, it should be understood that our invention is not limited to the specific examples set forth hereinbefore.

We claim:

1. The process for increasing the tensile strength of paraffin wax containing not more than about 1% oil which comprises incorporating in said paraffin wax about 1% to 10% of petrolatum wax, said petrolatum wax having a melting point above about 145° F. and containing not more than 10% of oil.

2. The method of increasing the tensile strength of substantially oil free paraffin wax which comprises incorporating in said paraffin wax not more than about 10% of petrolatum wax, said petrolatum wax having a melting point above about 145° F. and containing not more than about 10% of oil.

3. The method of increasing the tensile strength of crystalline paraffin wax containing not more than about 1% oil which consists incorporating in said paraffin wax not more than about 10% of petrolatum wax, said petrolatum wax having a melting point above about 145° F. and containing not more than about 10% of oil.

4. A petroleum hydrocarbon wax of high tensile strength comprising an admixture of paraffin wax and not more than about 10% of petrolatum wax having a melting point above about 145° F. and containing not more than about 10% of oil, said admixture of waxes having an oil content of not more than about 2%.

5. A new composition of matter consisting of an admixture of paraffin wax containing not more than about 1% of oil and not more than about 10% of petrolatum wax having a melting point above 145° F. and containing not more than about 10% of oil.

6. A high tensile strength paraffin hydrocarbon wax comprising substantially entirely an admixture of paraffin wax and not more than about 10% of petrolatum wax having a melting point within the range of 150 to 170° F. and containing not more than about 10% of oil, said admixture of waxes having an oil content not greater than about 2%.

7. The method of increasing the tensile strength of crystalline paraffin wax which comprises incorporating therein not more than 10% of a substance, which reduces the crystal dimensions of the wax, selected from the group consisting of petrolatum wax having a melting point above about 145° F. and an oil content of not more than about 10%, ozokerite, and the aluminum chloride condensation products of naphthalene and chlorinated aliphatic hydrocarbons, said admixture containing not more than about 2% of oil.

8. A high tensile strength paraffin hydrocarbon wax comprising substantially entirely an admixture of paraffin wax and not more than about 10% of petrolatum wax derived from Salt Creek crude oil, said admixture of waxes having a melting point above about 135° F., and an oil content of not more than about 2%.

9. A high tensile strength crystalline paraffin hydrocarbon comprising substantially entirely an admixture of paraffin wax having an oil content of not more than 1% and not more than about 10% of a petrolatum wax having a melting point above about 145° F. and an oil content of not more than 10%, said admixture of waxes having a melting point above about 135° F. and an oil content of not more than about 2%.

ELMER WADE ADAMS.
FREDERICK H. MacLAREN.